United States Patent [19]
Hellenbrandt

[11] Patent Number: 6,145,421
[45] Date of Patent: Nov. 14, 2000

[54] METHOD AND APPARATUS FOR CARRYING OUT THE ANNEALING STEP OF A GALVANNEALING PROCESS

[75] Inventor: Rainer Hellenbrandt, Willich, Germany

[73] Assignee: SMS Schloemann-Siemag Aktiengesellschaft, Düsseldorf, Germany

[21] Appl. No.: 09/310,830

[22] Filed: May 12, 1999

[30] Foreign Application Priority Data

May 16, 1998 [DE] Germany ............................ 198 22 147

[51] Int. Cl.[7] ........................................................ B26D 7/06
[52] U.S. Cl. .................................. 83/27; 83/153; 83/156
[58] Field of Search ................................ 83/27, 102, 104, 83/158, 155, 468.6, 468.5, 468.7, 151, 153, 111

[56] References Cited

U.S. PATENT DOCUMENTS

| | | | |
|---|---|---|---|
| 4,252,040 | 2/1981 | Kiefer | 83/153 |
| 4,321,848 | 3/1982 | Millar et al. | 83/153 |
| 4,448,099 | 5/1984 | Kuroda et al. | 83/27 |
| 4,546,683 | 10/1985 | Volkel et al. | 83/27 |
| 4,828,446 | 5/1989 | Lauffer | 83/468.6 |
| 4,833,954 | 5/1989 | Jenkner | 83/27 |
| 5,088,364 | 2/1992 | Stolzer | 83/153 |

FOREIGN PATENT DOCUMENTS 1243404 11/1964 Germany .

*Primary Examiner*—Rinaldi I. Rada
*Assistant Examiner*—Kim Ngoc Tran
*Attorney, Agent, or Firm*—Friedrich Kueffner

[57] ABSTRACT

A method and an apparatus for sorting out short lengths in light-section finishing lines, including a cutting device, for example, a cold shear, which has a cutting plane, wherein the cutting device is followed by a driven roller conveyor with a length stop which can be removed preferably by being lifted and is adjustable to the desired length. The rolling stock resting against the length stop is held after cutting to length in the cutting device until the short lengths have been conveyed away by the driven roller conveyor after lifting the length stop.

12 Claims, 3 Drawing Sheets

METHOD AND APPARATUS FOR CARRYING OUT THE ANNEALING STEP OF A GALVANNEALING PROCESS

BACKGROUND OF THE INVENTION

1. Field of the Invention

The present invention relates to a method and an apparatus for sorting out short lengths in light-section finishing lines, including a cutting device, for example, a cold shear, which has a cutting plane, wherein the cutting device is followed by a driven roller conveyor with a length stop which can be removed preferably by being lifted and is adjustable to the desired length.

2. Description of the Related Art

In the area following cold shears and separating cutting machines, short lengths always occur in the last positions to be cut, wherein the short lengths are sorted more or less effectively by subsequently arranged devices which are usually very complicated. These devices are composed of additional roller conveyors or tables with collecting troughs and clamping or drawing units which are structurally very complicated. In addition, these devices partially have to be operated manually.

German Patent 1 243 404 discloses a method and an apparatus for mechanically sorting out short lengths from a group of cut lengths. In accordance with the method, the group of cut lengths are clamped at both ends after being cut by a cold shear and raised from below from the conveying plane approximately in the middle, but in front of the free end of the shortest short length. Subsequently, the free upwardly directed ends of the short lengths are grasped and the short lengths are held back when the cut lengths are conveyed away.

This method does operate but is very complicated. This is because the apparatus for carrying out the method utilizes a cold shear with a raisable and lowerable holding-down device provided for the upper knife, a shear table arranged following the shear and a horizontally displaceable stopping carriage which is adjustable in accordance with the spacing of the desired commercial length, and the apparatus is composed of an independently controllable conventional raisable and lowerable holding-down device provided for the stopping carriage and of lifting bars which are arranged in the area of the shear table between the roller spacing of the conveyor rollers and can be raised and lowered independently of each other in a vertical plane, and of horizontally movable raisable and lowerable electrical lifting magnets arranged along side the travel path of the stopping carriage and above the conveying plane.

SUMMARY OF THE INVENTION

Therefore, it is the primary object of the present invention to provide a method and an apparatus for sorting out short lengths in light-section finishing lines which are of simple construction and are easy to manipulate.

In accordance with the present invention, the rolling stock resting against the length stop is held after cutting to length in the cutting device until the short lengths have been conveyed away by the driven roller conveyor after lifting the length stop.

The method is very simple because the cut lengths are held only at the cutting point in the cold shear and are conveyed further in the normal line after the short lengths have been conveyed away. In this connection, an electronic monitoring of the movement of the short lengths following the length stop is advantageous. The cut lengths are released by the monitoring unit shortly after the short lengths have passed the length stop or, if there are no short lengths, shortly after lifting of the length stop. Consequently, sorting out the short lengths only results in a short delay of the otherwise unchanged material flow.

Since, in accordance with a feature of the present invention, short lengths are placed in collecting troughs or deposit gratings following the length stop, the short lengths are each separately conducted in the normal manner through the finishing line. Consequently, no manual operations are required in processing the short lengths.

The apparatus for sorting out short lengths in light-section finishing lines which includes a cutting device, for example a cold shear or a separating cutting machine, which is followed by a driven roller conveyor with a raisable length stop for the rolling stock to be cut to length, wherein the length stop is adjustable in accordance with the desired length. This apparatus advantageously further includes a pressure regulating unit arranged underneath the ends of the cut lengths located on the side of the shear, wherein the pressure regulating unit serves to place the ends of the cut length in pressure contact with a stop.

The apparatus according to the present invention poses no problems with respect to procurement and its manufacturing costs are low because existing units can be used and a separate sorting device for the short lengths is not required. When the upper knife of the cold shear serves as the stop, it is even not necessary to provide a separate stop.

In accordance with an advantageous further development of the invention, the pressure adjusting unit includes a clamping beam which can be raised by means of at least one hydraulically actuated clamping cylinder and is guided by a vertical guide rod. The required clamping force can be varied by adjusting the hydraulic pressure. The clamping force can also be produced pneumatically, mechanically or magnetically. The guide rod absorbs the forces which act in the conveying direction on the clamping beam during the transportation of the cut lengths. As a result, the hydraulic cylinders and their piston rods remain free of bending forces.

It has been found advantageous that the clamping beam has in its upper side a L-shaped longitudinal groove into which L-shaped clamping pieces can be inserted which protrude above the clamping beam and which rest on an elastic pressure plate in the bottom of the groove. The L-shape of the longitudinal groove and of the clamping pieces ensures the radial locking thereof. As a result of the elastic pressure plate, the clamping pieces adapt to different cross-sectional shapes of the rolled products, so that the clamping beams can be used universally.

Since the L-shaped longitudinal groove has a small width as compared to the clamping beam and is arranged near the side facing the cutting plane, it is ensured that even short lengths whose lengths deviate only slightly from the cut length are not grasped by the clamping pieces and are sorted out as a result.

The same effect is achieved by a feature according to which the side of the clamping beam which faces the cutting plane is preferably located in this cutting plane.

Due to the fact that the upper side of the clamping beam is adapted to the contour of the cutting edge of the upper knife, all cut lengths are grasped and held by the clamping beam over the entire width of the upper knife.

For keeping the pressure adjusting unit clean, it is advantageous to provide the pressure adjusting unit with a cover device which includes a pivotable cover sheet whose pivot shaft is arranged parallel to the clamping beam. Consequently, scale or other impurities cannot drop onto the clamping beam or the clamping pieces. By pivoting the cover device away, this cover device is always automatically cleaned. The pneumatic drive of the pivoting device is not sensitive because compressed air leakages do not have any serious consequences.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DESCRIPTION OF THE PREFERRED EMBODIMENTS

Figure 1:
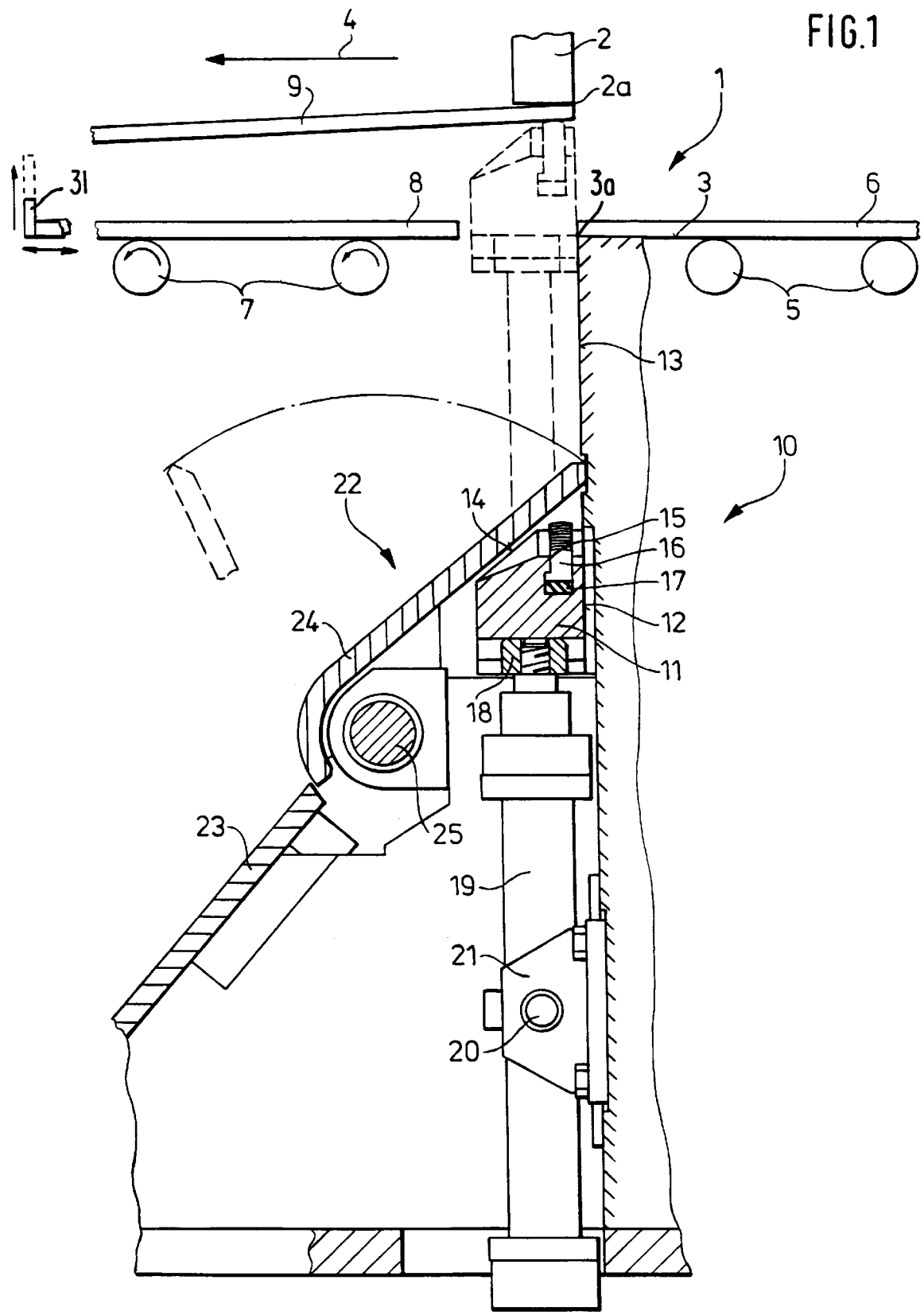
FIG. 1 is a side view, partially in section, of the apparatus according to the present invention showing one of the two clamping cylinders.

FIG. 1 of the drawing is a sectional view of a cold shear 1 with an upper knife 2 and shows the level of the cutting edge 3a of the lower knife 3, wherein the cutting edge 2a of the upper knife 2 is movable in the cutting plane 13. The conveying direction of the rolling stock is indicated by an arrow 4. Provided in front of the cold shear 1 is a roller table 5 with the rolling stock 6 which is to be cut to length; provided following the cold shear 1 is a driven roller table 7 with a short length 8 and a clamped cut length 9. The cut lengths rest against a length stop 31 whose length is adjustable and which can be removed by lifting as schematically indicated by arrows.

A pressure adjusting unit 10 is arranged underneath the upper knife 2. The pressure adjusting unit 10 is illustrated in solid lines in its position of rest and in broken lines in its position of operation. The pressure regulating unit 10 includes a clamping beam which is movable with its side 12 facing the cutting plane 13 in the cutting plane 13 of the upper knife 2. Provided on the upper side 14 of the clamping beam 11 and near the side 12 thereof is a L-shaped longitudinal groove 15 in which L-shaped clamping pieces 16 are arranged. The clamping pieces 16 protrude above the L-shaped longitudinal groove 15 and are in pressure contact with an elastic pressure plate 17 which is placed on the groove bottom. Starting from the longitudinal groove 15, the upper side 14 of the clamping beam 11 is bevelled in the conveying direction 4.

The clamping beam 11 is connected through a pressure nut 18 each to two hydraulically actuated clamping cylinders 19. The clamping cylinders 19 are mounted on the cold shear 1 through pivot bearings 20 and cylinder brackets 21.

The pressure regulating unit 10 can be covered in its position of rest by a cover device 22. The cover device 22 includes a cover sheet 23 which is fixedly connected to the shear and a pivotable cover sheet 24 whose pivot shaft 25 is arranged parallel to the clamping beam 11 and whose pivoted position is shown in broken lines.

Figure 2:
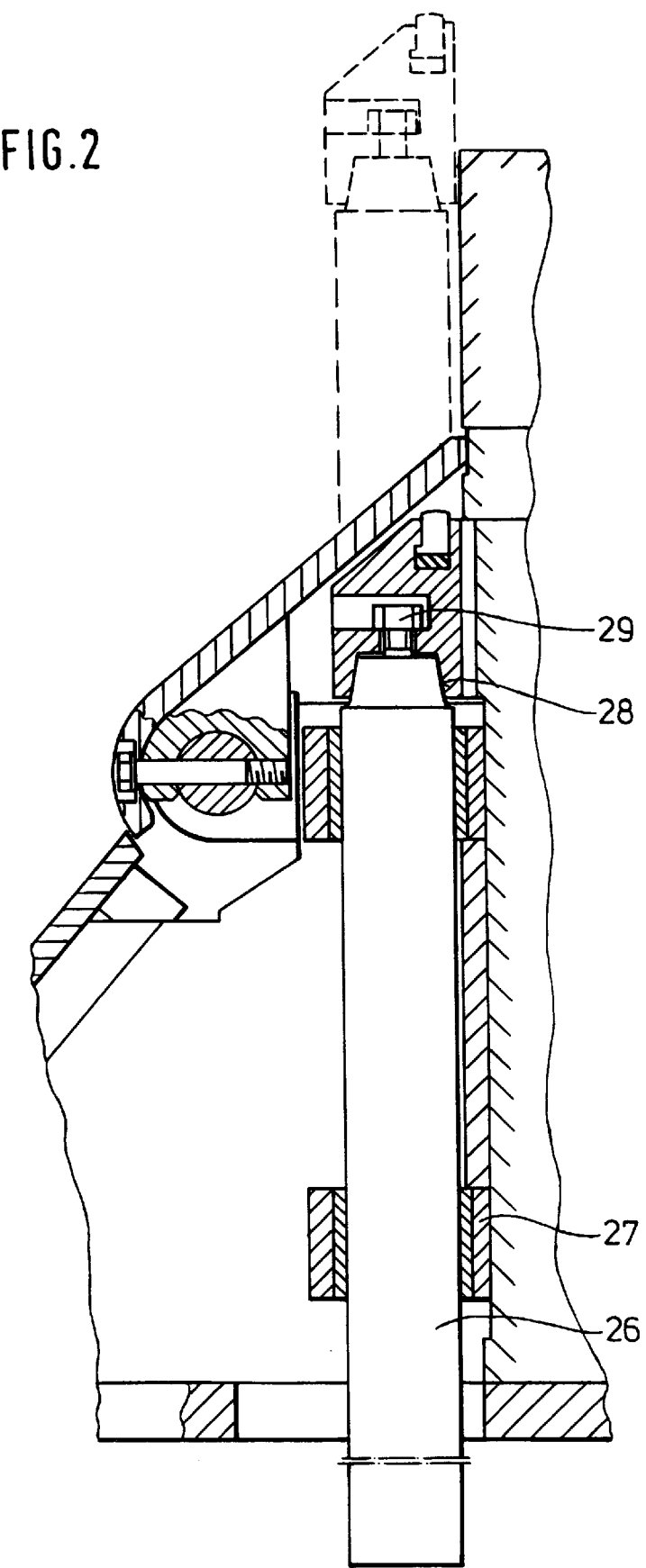
FIG. 2 is a side view, partially in section, showing the device with a guide rod.

In addition to the structural components illustrated in FIG. 1, FIG. 2 shows a guide rod 26 which is arranged between the clamping cylinders 19 and is guided in a guide holder 27 attached to the shear. The guide rod 26 is connected to the clamping beam 11 through a conical piece 28 and is screwed thereto by means of a nut 29.

Figure 3:
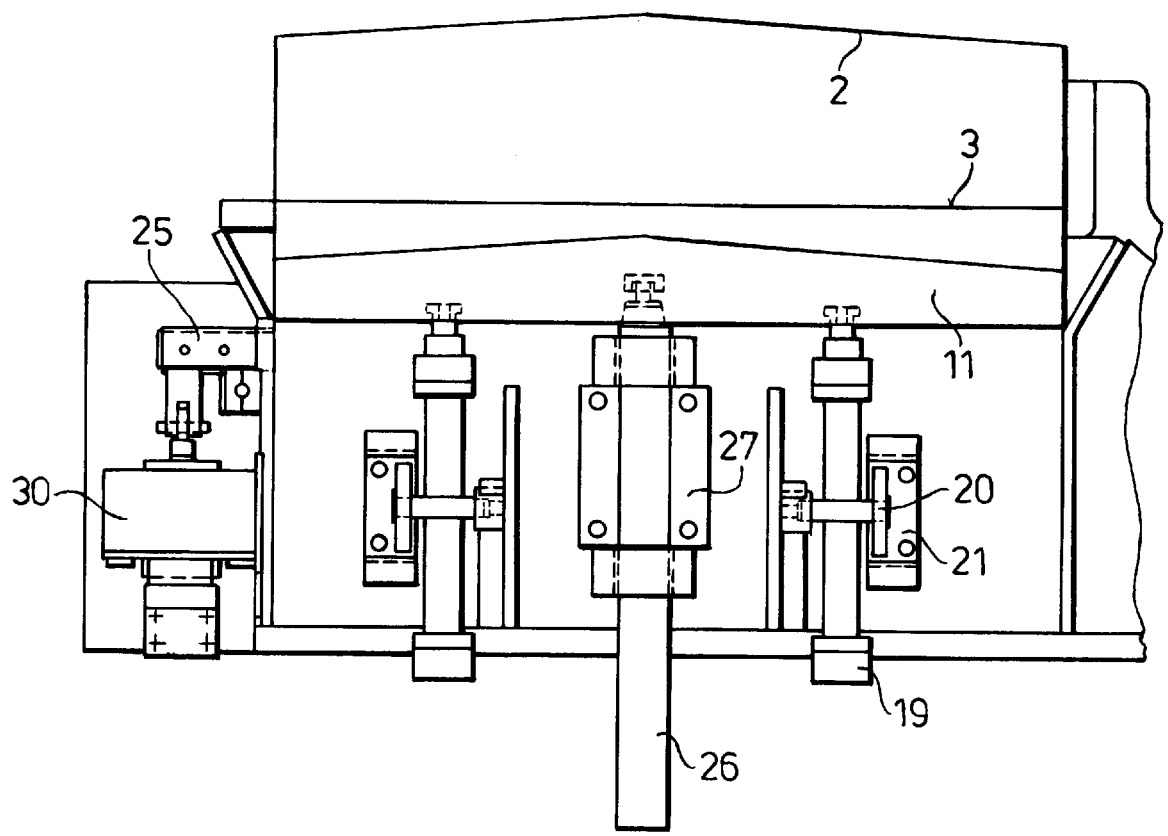
FIG. 3 is a front view of the apparatus with two clamping cylinders and the guide rod.

FIG. 3 is a front view showing the apparatus according to the present invention with the clamping beam 11, the clamping cylinders 19 and the guide rod 26. Also illustrated are the pivot bearing 20 with the cylinder brackets 21, the clamping cylinders 19 and the guide holders 27 of the guide rod 26. The roof-shaped upper side 14 of the clamping beam 11 is located underneath the cutting edge 3 of the lower knife and is adapted to the shape of the upper knife 2 which serves as a stop.

The cover device 22 is actuated by a compressed air cylinder 30 which is connected to the pivot shaft 25 and the pivotable cover sheet 24 connected to the shaft 25.

The apparatus according to the present invention operates as follows:

Rolling stock travels from the cooling bed of the rolling mill over the roller table 5 to the cold shear 1. Since the cold shear 1 is open and the pressure regulating unit 10 is lowered, the rolling stock 6 including the short lengths 8 are conveyed over the driven roller table 7 up to the adjustable and raisable length stop 31.

After the rolling stock 6 has been cut to cut lengths 9, the upper knife 2 of the cold shear 1 moves into its upper position. Subsequently, the pivotable cover sheet 24, actuated by the laterally arranged compressed air cylinder 30, pivots into the open position. When this position is reached, the clamping cylinders 19 start from their basic position and simultaneously raise the clamping beam 11. Depending on the thickness of the material, clamping of the cut lengths 9 between the upper knife 2 and the clamping piece 17 takes place earlier or later. The required gripping force can be adjusted by varying the hydraulic cylinder.

When the signal "clamped" occurs, the driven roller table 7 starts up and, after the length stop 31 has been raised, conveys the short lengths into the devices provided for this purpose.

As soon as the short lengths 8 have left the driven roller table 7, the rollers of the roller table 7 are stopped. The clamping cylinders 19 then return into their basic position, so that the cut lengths are once again placed on the driven roller table 7.

After the clamping cylinder 19 has reached its basic position, the pivotable cover sheet 24 is pneumatically pivoted into its closed position, so that the pressure regulating unit 10 is protected from contamination, for example, scale. The cut lengths 9 which are now placed on the driven roller table 7 (without the short lengths 8) are ready for being conveyed away.

The apparatus according to the present invention, which of course can also be used for processing different types of rod-shaped products with short lengths, makes it possible to sort out short lengths and to further transport the short lengths over the finishing line without impairing the normal sequence of processing the cut lengths, wherein this can be effected with little additional structural and operational requirements.

While specific embodiments of the invention have been shown and described in detail to illustrate the inventive principles, it will be understood that the invention may be embodied otherwise without departing from such principles.

I claim:

1. A method of sorting out short lengths in a light-section finishing line, with a cutting unit having a lower knife and an upper knife defining a cutting plane, a driven roller table for conveying away cut lengths and short lengths following the cutting device, and with a length stop for the cut lengths and the short lengths, wherein the length stop is removable by raising the length stop and the length stop is adjustable to the desired length of the cut lengths, the method comprising clamping the cut lengths resting against the length stop after cutting to length in the cutting device at least until the short lengths of the rolling stock which also rest against the length stop but are not clamped because of their short length have been conveyed away after lifting the length stop from the driven roller table.

2. The method according to claim 1, wherein the cutting device is a cold shear.

3. The method according to claim 1, comprising placing the short length following the length stop in collecting drops or on depositing crates.

4. An apparatus for sorting out short lengths in a light-section finishing line, the apparatus comprising a lower knife and an upper knife defining a cutting device having a cutting plane and a driven roller table for conveying away cut lengths and short lengths following the cutting device, and a length stop for the cut lengths and the short lengths, wherein the length stop is adjustable to a desired length of the, and the length stop is removable by lifting the length stop, further comprising a pressure regulating unit mounted underneath ends of the cut lengths on a side of the cutting device, wherein the pressure regulating unit is configured to place the cut lengths in pressure contact with a stop above the ends of the cut lengths on the side of the cutting device.

5. The apparatus according to claim 4, wherein the cutting device is a cold shear.

6. The apparatus according to claim 5, wherein an upper knife of the cold shear is the stop.

7. The apparatus according to claim 4, wherein the pressure regulating unit comprises a clamping beam, further comprising at least one hydraulically operated clamping cylinder for raising the clamping beam, and a vertically extending guide rod for guiding the clamping beam.

8. The apparatus according to claim 7, wherein the clamping beam has an upper side with an L-shaped longitudinal groove provided in the upper side, the longitudinal groove being configured to receive L-shaped clamping pieces, wherein the L-shaped clamping pieces protrude above the clamping beam and rest on an elastic pressure plate placed on a bottom of the longitudinal groove.

9. The apparatus according to claim 8, wherein the L-shaped longitudinal groove has a substantially smaller width than the clamping beam, and wherein the L-shaped longitudinal groove is provided at a side of the clamping beam facing the cutting plane.

10. The apparatus according to claim 9, wherein the side of the clamping beam extends in the cutting plane.

11. The apparatus according to claim 8, wherein the upper side of the clamping beam has a contour identical to a contour of a cutting edge of the upper knife.

12. The apparatus according to claim 7, further comprising a cover device for the pressure regulating unit, the cover device comprising a cover sheet mounted so as to be pivotable about a pivot shaft, wherein the pivot shaft extends parallel to the clamping beam.

* * * * *